United States Patent [19]
Murakami

[11] Patent Number: 5,544,840
[45] Date of Patent: Aug. 13, 1996

[54] CONTINUOUS FILM TAKE-UP APPARATUS

[75] Inventor: Motoaki Murakami, Wakayama, Japan

[73] Assignee: Noritsu Koki Co., Ltd., Wakayama, Japan

[21] Appl. No.: 339,251

[22] Filed: Nov. 10, 1994

[30] Foreign Application Priority Data

Nov. 12, 1993 [JP] Japan .................... 5-283489

[51] Int. Cl.⁶ .................................. B65H 18/10
[52] U.S. Cl. ....................... 242/532.7; 242/528
[58] Field of Search .................... 242/528, 532, 242/532.7, 534

[56] References Cited

U.S. PATENT DOCUMENTS

| | | | |
|---|---|---|---|
| 1,346,356 | 7/1920 | Wenderhold | 242/532.7 |
| 3,604,648 | 9/1971 | Schmidt | 242/532 |
| 3,749,328 | 7/1973 | Dusenbery | 242/548 |
| 3,913,367 | 10/1975 | Galletti | 242/532.7 |
| 4,010,912 | 3/1977 | Dreher et al. | 242/532.6 |
| 4,175,713 | 11/1979 | Jores | 242/532.7 |
| 4,534,518 | 8/1985 | Kashiwaba | 242/532.7 |
| 4,957,247 | 9/1990 | Nakamura et al. | 242/532.7 |
| 5,238,198 | 8/1993 | Jingu et al. | 242/532.7 |

*Primary Examiner*—John P. Darling
*Attorney, Agent, or Firm*—Wenderoth, Lind & Ponack

[57] ABSTRACT

A continuous film take-up apparatus comprises a guide feeder for guiding and feeding a succession of films into a film supplier and a drive train for rotating a take-up reel of the film supplier. The guide feeder has a guide region composed of an infeed guide and a tilt guide, and also has feed rollers for feeding the film towards the film supplier. Both the tilt guide and the feed rollers are actuated by the power of a drive unit.

6 Claims, 7 Drawing Sheets

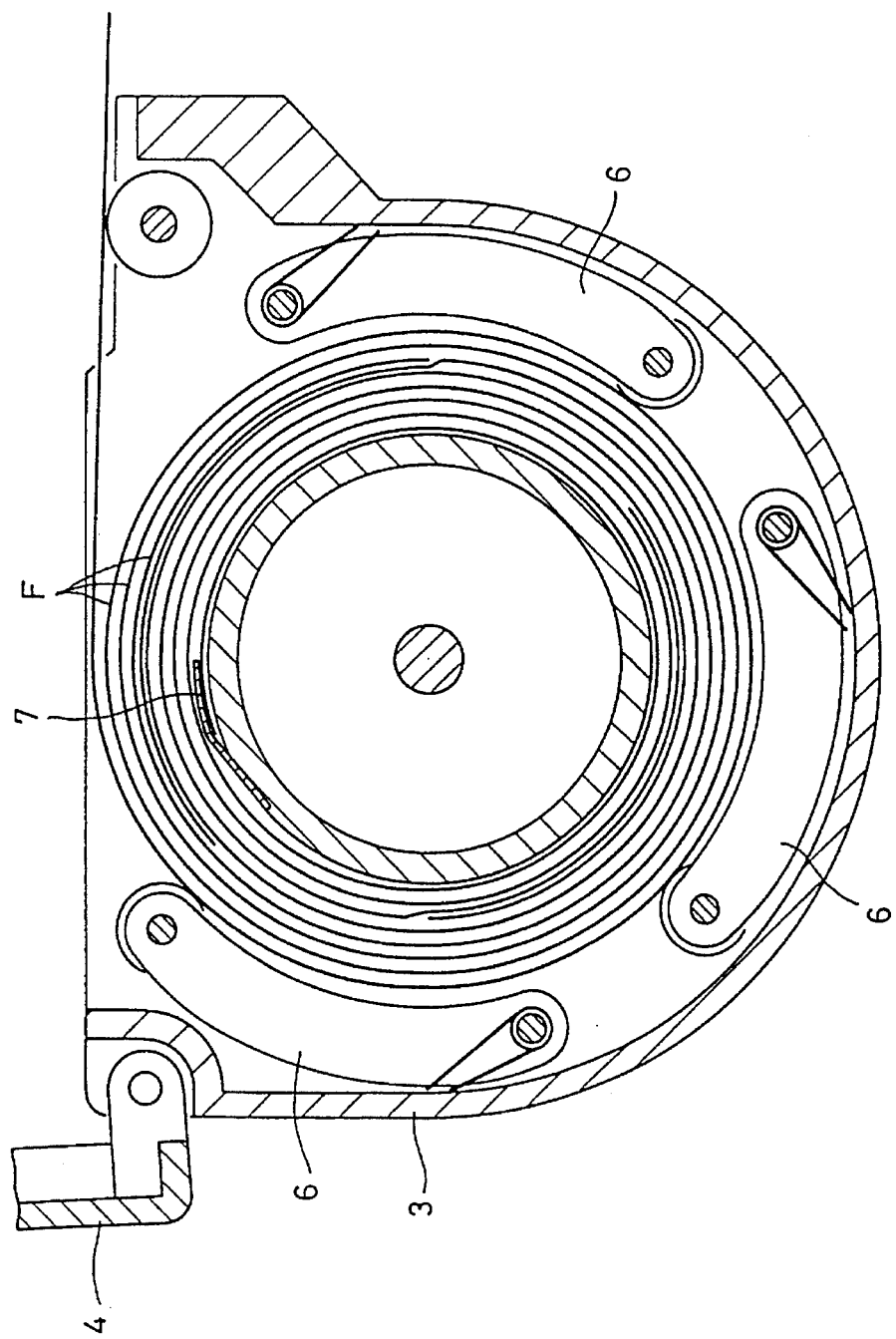

CONTINUOUS FILM TAKE-UP APPARATUS

BACKGROUND OF THE INVENTION

The present invention relates to a continuous film take-up apparatus for taking up a plurality of tapes of film in succession into a film magazine.

For carrying out a procedure of printing pictures onto a photographic film in a photographic printer with efficiency, the feeding of the film to the printer is conducted with the use of a film magazine in which a plurality of film tapes spliced with one another using adhesive tapes are wound on a reel.

For taking up the films in the film magazine, a conventional method includes splicing the tapes of film by hand and manually winding the tapes onto the reel of the film magazine.

However, such a troublesome combination of the splicing of two films by hand and the taking up of the films in the film magazine requires considerable amounts of time and labor and the efficiency of feeding of the films will hardly be increased.

We, the inventors of the present invention, have developed and proposed a continuous film take-up apparatus for feeding a plurality of films in succession to a photographic printer. The continuous film take-up apparatus allows the plural films to be continuously wound on a reel while overlapped one after the other without splicing as compared with the conventional manner. In particular, the leading end of each film is placed not over but under the trailing end of a preceding film so that the films can be released in succession from the film magazine due to the friction between the leading and trailing ends.

The continuous film take-up apparatus however fails to have a scheme for overlapping the films with the leading end placed under the trailing end automatically. To do so, a labor process is still needed. It is thus desired to have such a scheme.

In view of the foregoing conventional method of taking up films in the film magazine, an object of the present invention is to provide an improved continuous film take-up apparatus in which a plurality of films are fed and wound in a succession onto a reel of the film magazine without the need of splicing the films, thus ensuring an efficient film take-up action.

SUMMARY OF THE INVENTION

A continuous film take-up apparatus according to the present invention comprises a guide feeder means for guiding and feeding a succession of films into a film supplier, and a drive train for driving a take-up reel of the film supplier to rotate, in which the guide feeder means moves towards the film supplier to place the leading end of a current film under a film hold-down plate of the reel or the trailing end of a preceding film wound on the reel and moves from the same while lifting up the trailing end of the current film from the reel.

Preferably, the guide feeder means has a guide region thereof which is tiltable so that when the guide region conducts a tilting action, its front end comes close to and departs from the film supplier.

The guide feeder means may also has feed rollers for feeding the film towards the film supplier and a drive unit for rotating the feed rollers and may be arranged in a compact construction where the tiltable guide region is actuated by the power of the drive unit transmitted through a common drive shaft to the feed roller.

More preferably, the guide feeder means advances the current film until its leading end comes under the film hold-down plate or the trailing end of the preceding film with some looseness.

In action, the continuous film take-up apparatus of the present invention allows a succession of films to be continuously taken up in the film supplier or film magazine.

According to the above first inventive feature, the guide feeder means moves towards the film supplier to place the leading end of a current film under the film hold-down plate of the reel or the trailing end of a preceding film wound on the reel and moves from the same while lifting up the trailing end of the current film from the reel.

According to a second inventive feature, the tiltable guide region of the guide feeder means moves to and from the film supplier, thus allowing the leading end of the current film to be placed under the trailing end of the preceding film on the reel. In both the features, as the films are continuously fed by the drive unit, their leading and trailing ends are overlapped one after another on the reel.

According to a third inventive feature, the single drive unit actuates the feed rollers and the tiltable guide region of the guide feeder means, thus contributing to the compact size of the continuous film take-up apparatus.

According to a fourth inventive feature, the guide feeder means drives each film to be loosened at the leading end for ease of taking up and to thus be wound on the reel with certainty.

BRIEF DESCRIPTION OF THE DRAWINGS

FIG. 7 s a schematic view showing the taking up of a film in a film magazine.

DETAILED DESCRIPTION OF THE PREFERRED EMBODIMENT

One preferred embodiment of the present invention will be described referring to the accompanying drawings.

Figure 1:
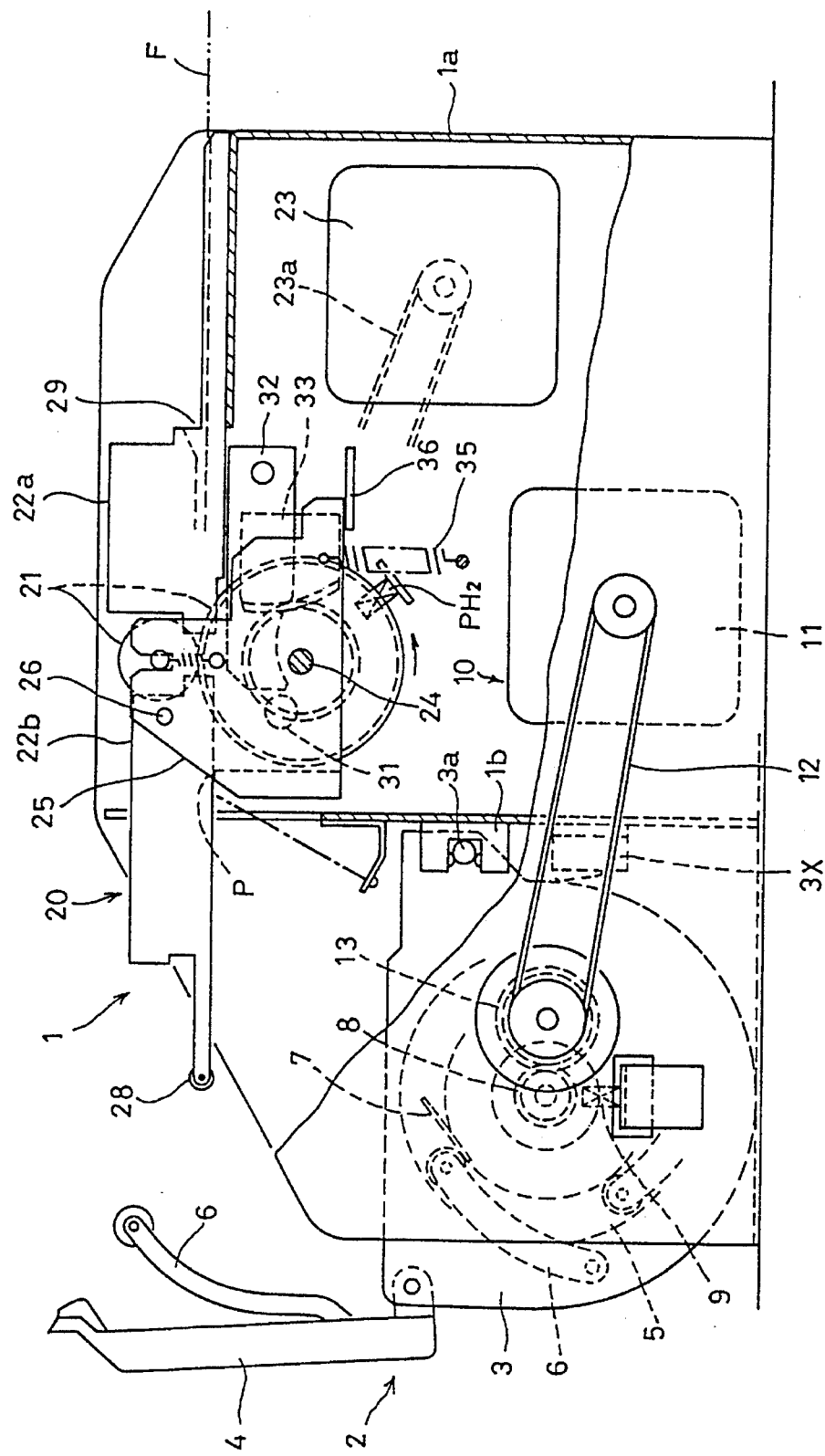
FIG. 1 is a schematic view of the entire arrangement of a continuous film take-up apparatus showing one embodiment of the present invention.

FIG. 1 is a schematic view of the entire arrangement of a continuous film take-up apparatus 1 according to the embodiment. In fact, the entire arrangement of the continuous film take-up apparatus 1 is installed in an outer casing which is not shown for ease of the description. The continuous film take-up apparatus 1 allows a film magazine (film supplier) 2 to be loaded and unloaded for take-up of films. The film magazine 2 is not limited to the shape shown but may be available in any appropriate shape.

The film magazine 2 comprises a magazine casing 3, a cover 4, a magazine reel 5 on which a tape of film F is wound, and a film hold-down 6, the latter two being contained in the magazine casing 3. The film magazine 2 is loaded from the left side to the C-shaped space of an inner casing 1a of the continuous film take-up apparatus 1 as shown in FIG. 1. For detachably securing the film magazine 2, a pin 3a mounted to the front end of the magazine casing 3 is coupled to a receptacle 1b provided on the innermost side wall of the C-shaped space of the inner casing 1a. There are also shown a film hold-down plate 7, a reel gear 8 mounted on one side of the film casing 3, a reel detector 9, and a magazine sensor switch 3X.

The continuous film take-up apparatus 1 comprises a drive train 10 for rotating the magazine reel 5 in the film magazine 2, and a guide feeder means 20 for guiding and feeding the film into the film magazine 2. The drive train 10 transmits the power from a take-up drive motor 11 via a belt 12 to a drive gear 13. As the drive gear 13 rotates the reel gear 8, the magazine reel 5 takes up the film F.

The guide feeder means 20 comprises a pair of feed rollers 21, 21 for feeding the film F, and a guide 22 for guiding the film F. The feed rollers 21,21 are driven for rotation through a roller shaft 24 by a motor 23. The lower one of the feed rollers 21 is connected by a one-way clutch 24a to the roller shaft 24 for rotation in the arrow direction shown in FIG. 1. The guide 22 comprises an infeed guide 22a and a tilt guide 22b. The tilt guide 22b is arranged to be tiltable by means of a partial power of the motor 23.

Figure 2:
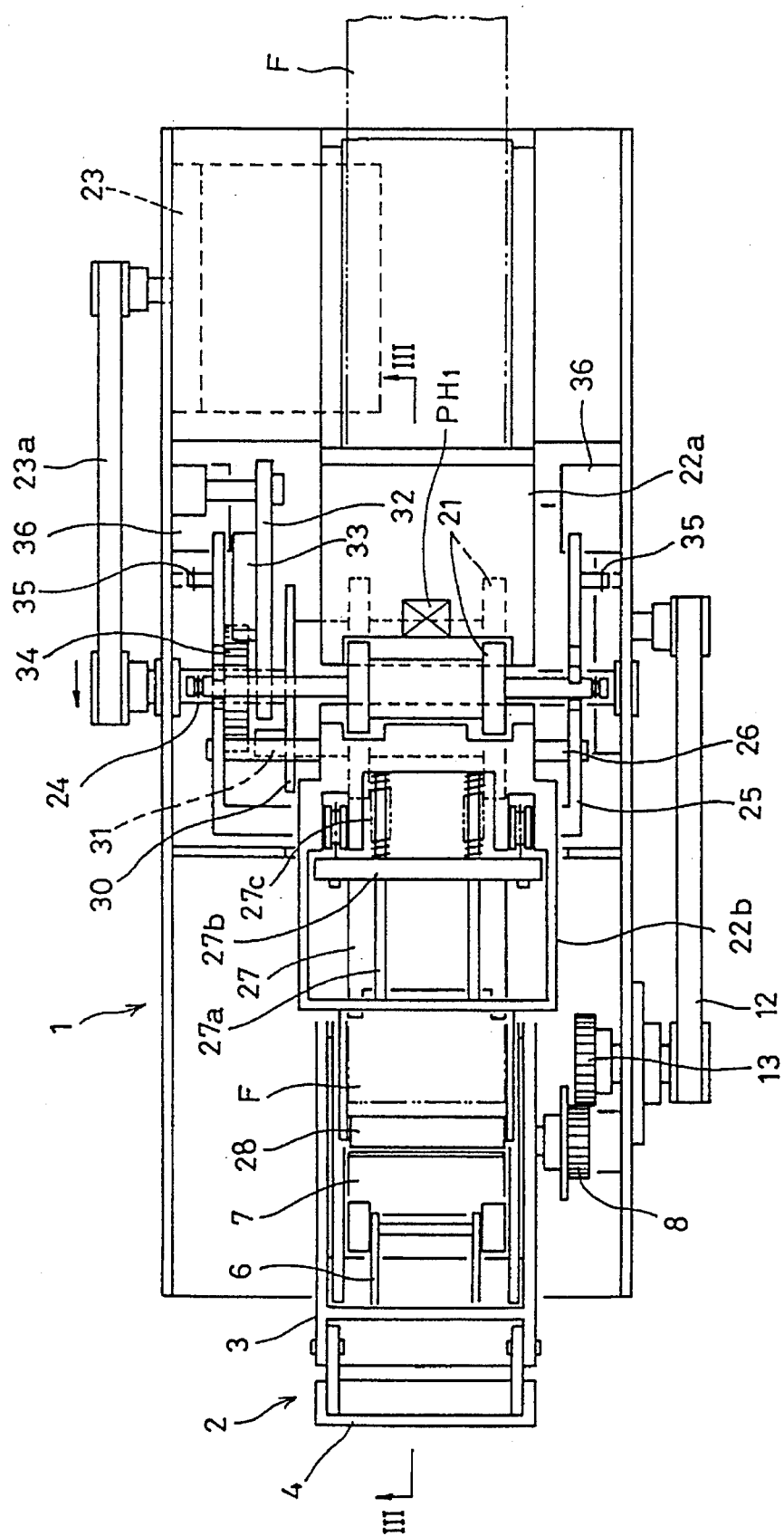
FIG. 2 is a plan view of the arrangement of FIG. 1.

The infeed guide 22a is fixedly mounted to the inner casing 1a. A substantially C-shaped guide bracket 25 is pivotably mounted at both sides to a roller shaft 24 which extends crosswise through the two side plates of the inner casing 1a (as best shown in FIG. 2). The two sides of the guide bracket 25 are formed of a truncated triangle and on upper regions of which the upper feed roller 21 and the tilt guide 22b are mounted. The tilt guide 22b is pivoted on a support pin 26 so that it remains horizontal (FIG. 1) as supported at the point P of the guide bracket 25 and is tilted down (or rotated) when the guide bracket 25 turns counter-clockwise about the shaft 24.

Figure 3:
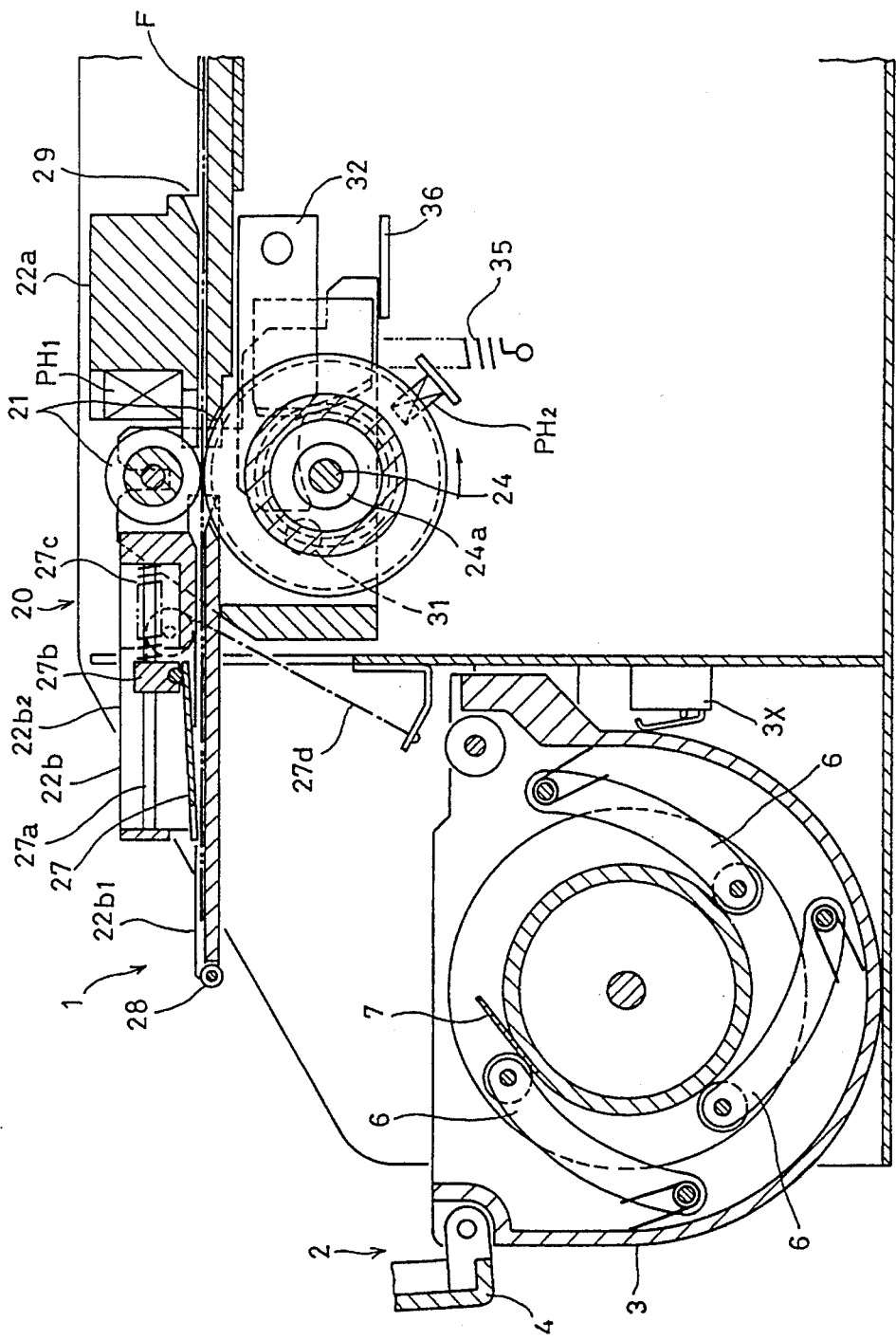
FIG. 3 is a cross sectional view taken along the line III—III of FIG. 2.

The tilt guide 22b comprises a guide frame $22b_1$ for guiding the film F and a guide box $22b_2$ placed over the guide frame $22b_2$, as shown in FIG. 3. A film hold-down 27 is provided in the guide frame $22b_1$ for projecting and retracting from the front end of the same while being slightly movable up and down.

The film hold-down 27 is pivotably joined by a pin to a guide block 27b which is slidably mounted on two guide rods 27a extending throughout the guide box $22b_2$. The guide block 27b is tensioned by ropes 27d so that it can resist against the yielding force of two springs 27c, as shown in FIG. 3. Also, a guide roller 28 is mounted to the front end of the guide frame $22b_1$.

When the tilt guide 22b is tilted with its front end (or left end in FIGS. 1 and 3) moving downward, the ropes 27d lose their tension and allow the springs 27c to expand. As the result, the film hold-down 27 is pressed forward to project from the guide box $22b_2$. The infeed guide 22a has a film inlet 29 provided in the upstream end thereof and a photoelectric sensor $PH_1$ mounted to the downstream end thereof for detecting the leading and trailing end of the film F transferred through the film inlet 29.

As shown in FIG. 2, a detect disk 30 is disposed beside the lower feed roller 21 for detecting the rotation of the same and has a small roll (or cam) 31 mounted to the outer side thereof. In relation to the roll 31, an arm (or cam follower) 32 is pivotably mounted by a pivot pin to the inner casing 1a. As the detect disk 30 on the feed roller 21 rotates, the small roll 31 is turned counter-clockwise to come into contact with the arcuate distal end of the arm 32 and lift up the arm 32.

A toothed arc or first engagement element) 33 equivalent to ⅛ of a round gear is fixedly mounted to the outer side of the arm 32. Also, a gear or second engagement element 34 arranged in mesh with the toothed arc 33 is fixedly mounted to the guide bracket 25 for rotation relative to the roller shaft 24. In action, when the arm 32 is turned upward by the lifting movement of the small roll 31, the gear 34 rotates to tilt the guide bracket 25. The guide bracket 25 remains urged by a return spring 35 disposed vertically to hold in its horizontal position. In addition, a stopper 36 is mounted to the inner casing 1a on which the guide bracket 25 in its horizontal position is seated as being urged downwardly by the spring 35.

The detect disk 30 has an aperture provided in the flange portion thereof for allowing a photoelectric sensor $PH_2$ to detect an angular position thereof.

The operation of taking up a tape of film in the film magazine with the continuous film take-up apparatus 1 will now be explained.

First, the film F is fed through the film inlet 29 into the apparatus (until it reaches between the two feed rollers 21, 21). When the leading end of the film F is detected by the photoelectric sensor $PH_1$, the motor 23 starts rotating. The rotation of the motor 23 is transmitted via the belt 23a to the roller shaft 24 which in turn rotates the detect disk 30 and the feed rollers 21, 21. The small roll 31 on the detect disk 30 is then moved from its original position shown in FIG. 1 in the counter-clockwise direction about the roller shaft 24 to the arm 32. As the roll 31 runs further, the arm 32 is lifted up and turns about its pivot pin.

Figure 4:
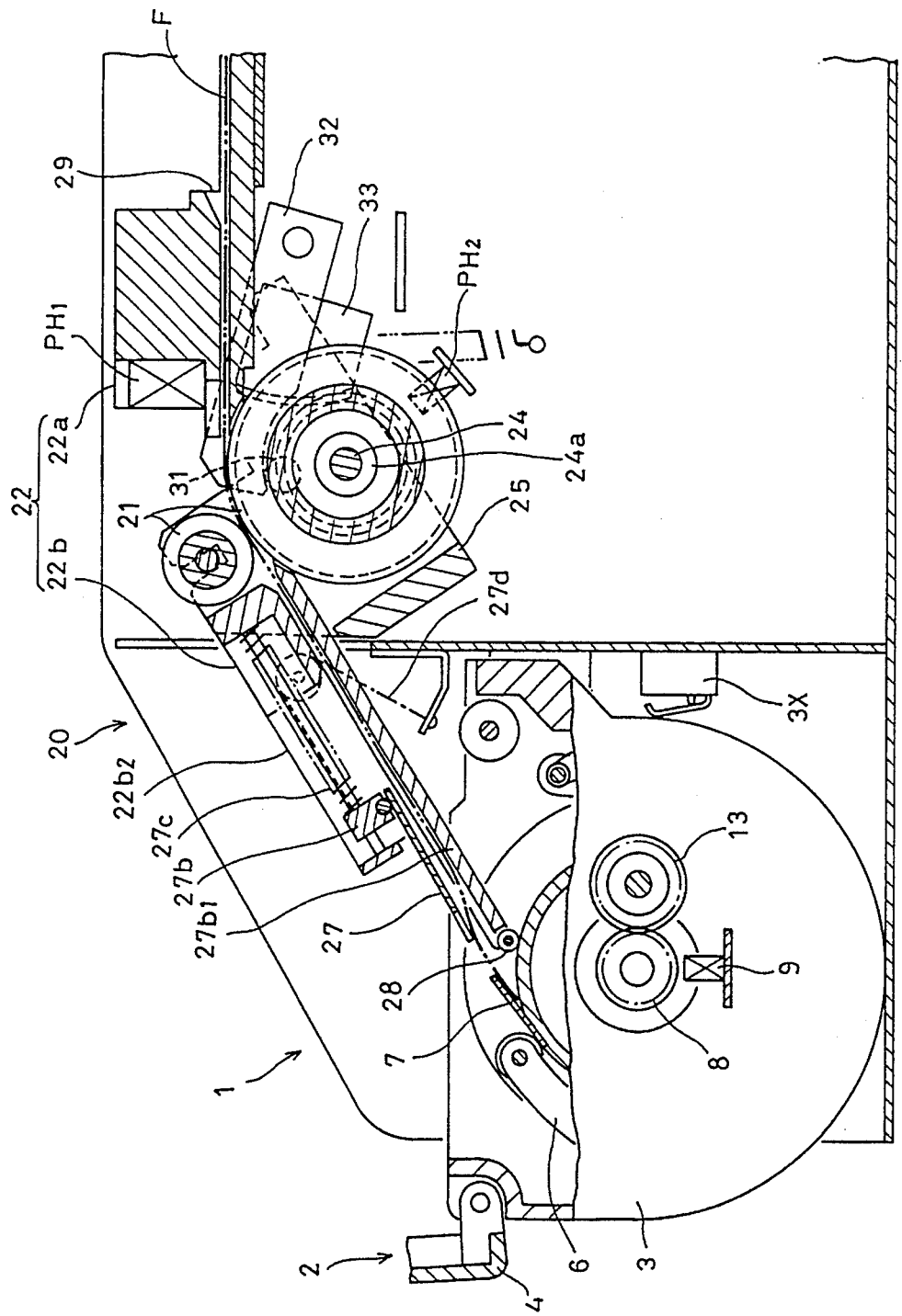
FIGS. 4, 5, and 6 are explanatory views of the action of the arrangement of FIG. 1 same.

Then, the toothed arc 33 coupled to the arm 32 moves upward and rotates the gear 34. The guide bracket 25 linked to the gear 34 is thus turned (or tilted down) about the roller shaft 24 until it comes to the position shown in FIG. 4 (which can be preset by determining the number of actuating pulses for the motor 23). While the tilt guide 22b is in horizontal before tilting down, the film F is advanced to about 15 mm from the front end of the tilt guide 22b. As the guide roller 28 reaches the magazine reel 5, the film F comes to the front end of the tilt guide 22b. (This feeding action can be determined by the diameter and angular position of the upper feed roller 21.) As the feed rollers 21, 21 are further rotated, the film F passes under the film hold-down 7 and reaches the magazine reel 5 with some looseness, as shown in FIG. 4.

When the tilt guide 22b is tilted down, the film hold-down 27 moves out from the guide box $22b_2$ of the tilt guide 22b to hold the leading end of the film F allowing no curling of the film.

The film hold-down 27 is pivotably mounted by the pin to the block 27b. As the tilt guide 22b tilts down, the block 27b tensioned with the ropes 27d is pressed forward by the biasing force of the springs 27c to move out from the guide box $22b_2$.

When the tilt guide 22b stops tilting, the take-up drive motor 11 starts rotating to transmit the rotating power through the belt 12 to the drive gear 13. The drive gear 13 rotates the magazine gear 8 and the magazine reel 5.

When the trailing end of the film F is detected by the photoelectric sensor $PH_1$, the take-up drive motor 11 stops after performing a final feed and ceases the winding action. The motor 23 starts and drives the small roll 31 to its original angular position (FIG. 1) and simultaneously, the tilt guide 22b and the guide bracket 25 are returned back by the action of the return spring 35 (until the guide bracket 25 is seated on the stopper 36 and the tilt guide 22b is horizontal).

Figure 5:
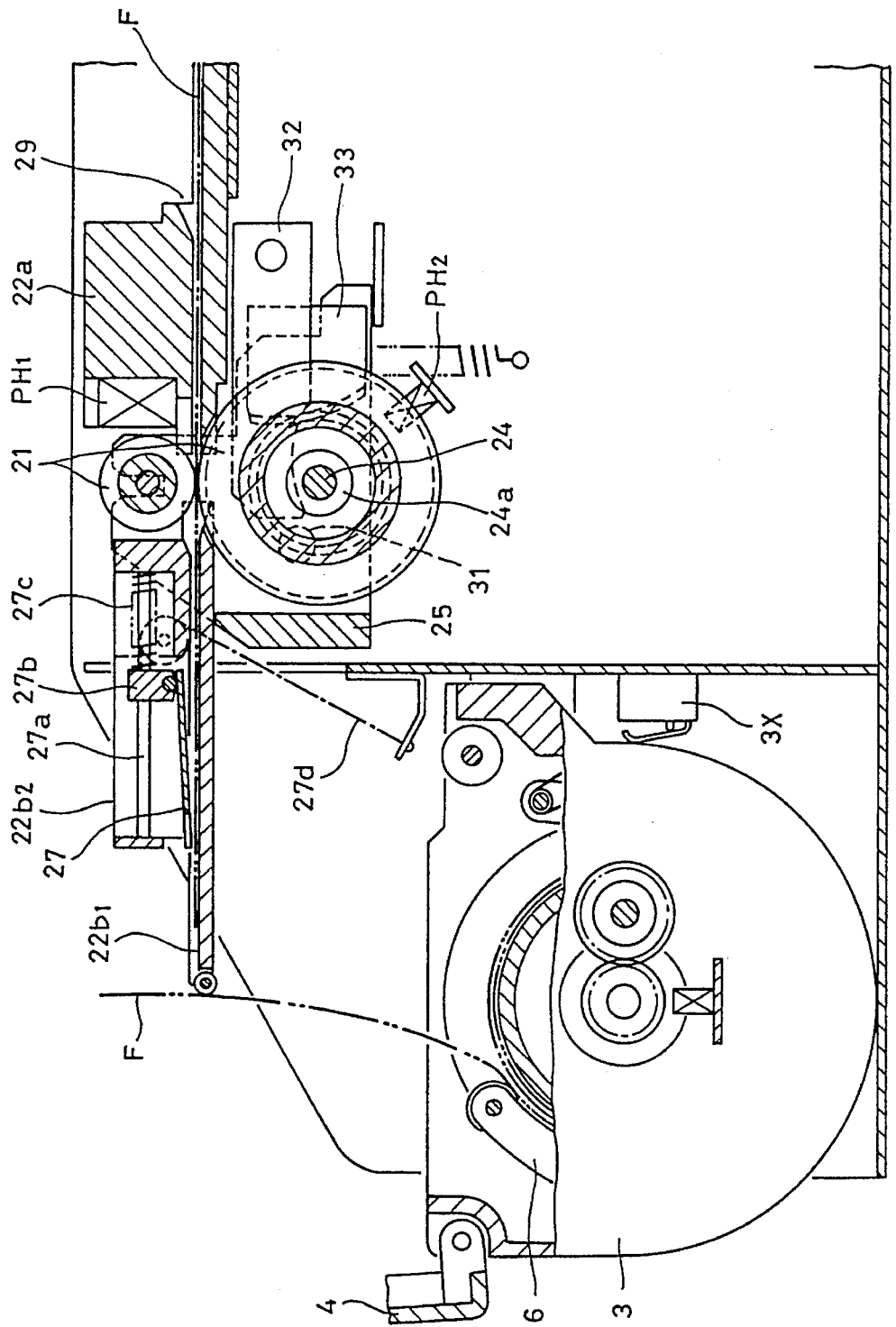

By then, the trailing end of the film F has been passed away from the tilt guide 22b but stays at the guide roller 28 as shown in FIG. 5.

Figure 6:
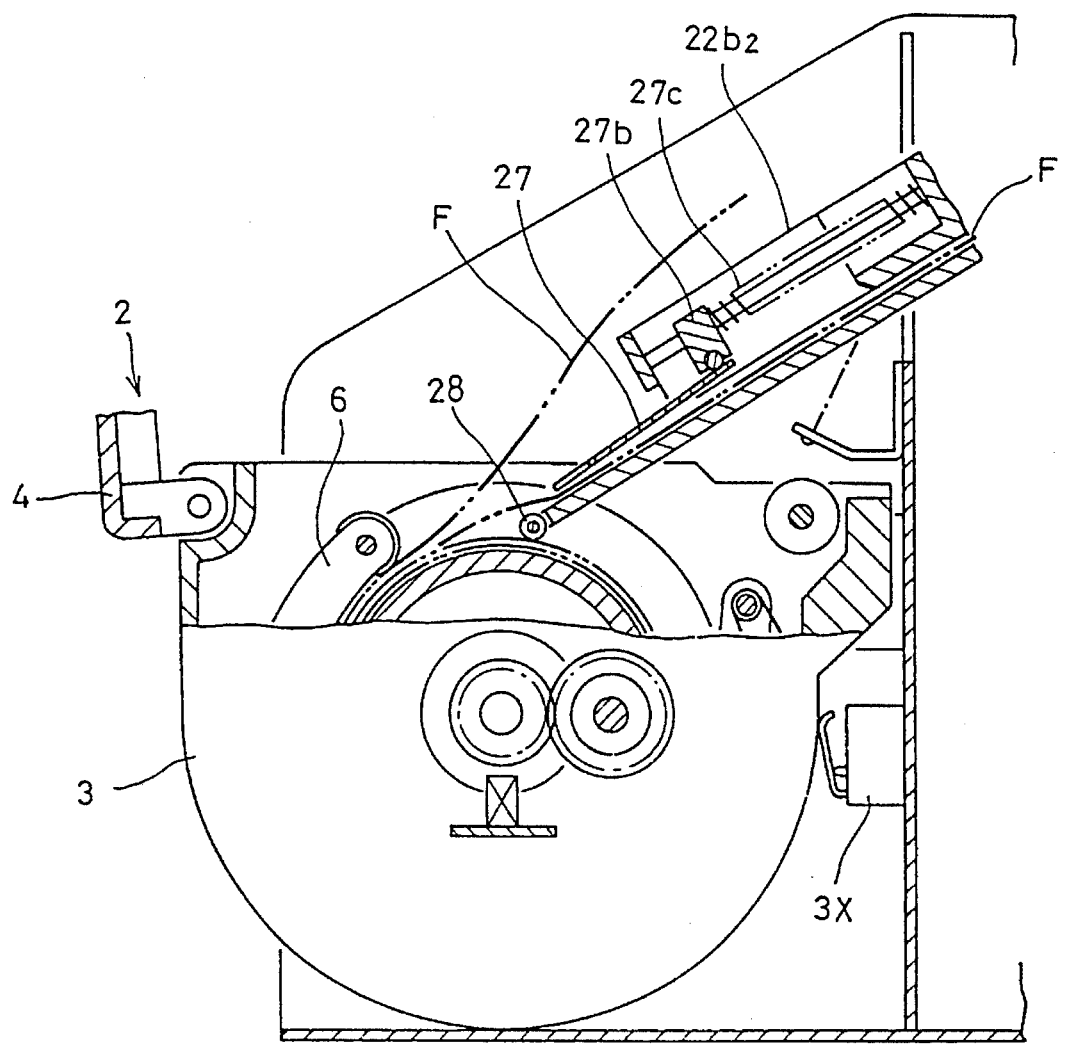

Accordingly, when a succeeding film is fed to the continuous film take-up apparatus, it comes to under the preceding film F as shown in FIG. 6 due to the initial action of the apparatus. The take-up action can then be commenced by starting the take-up drive motor 11.

As a plurality of the films are wound on the magazine reel 5, the guide roller 28 of the front end of the tilt guide 22b touches the film roll at a higher location thus allowing the tilt guide 22b to move less distance about the pin 26.

For resetting the magazine reel 5 and the tilt guide 22b, the take-up drive motor 11 and the film feed motor 23 are started by pressing a standby switch (not shown) mounted on the outer casing. Then, through detecting an aperture in the magazine gear 8 with the reel detector 9, the film hold-down plate 7 is placed at its initial position as shown in FIG. 2. Similarly, upon the photoelectric sensor $PH_2$ detecting an aperture in the detect disc 30, the small roll 31 is halted at its original position.

When the film magazine 2 (film supplier) is fully loaded with the films, it is unloaded from the continuous film take-up apparatus and may be mounted to the film feeder inlet of a photographic printer for feeding of the films without loss of time.

The plurality of the films are stored in the film magazine 2, as shown in FIG. 7, with the leading end of each film being overlapped with and more particularly, placed under the trailing end of a preceding film. As the result, the leading end of every film can be released out from the film magazine 2 as is driven by the friction with the trailing end of the preceding film. Hence, the a troublesome film splicing action required in the prior art will be eliminated.

It is understood that the present invention is not limited to the guide feeder means of the embodiment where the leading end of a film is placed under the trailing end of a preceding film with the tilt guide 22b being tilted down about the pivot pin towards the film magazine 2, but any other appropriate method may be utilized in the guide feeder means.

For example, a linear guide in the guide feeder means is provided in a tilted form for moving to and from the film inlet of the film magazine 2 so that its front end when moving away from the film magazine 2 can draw back in the upper rear direction to lift up the trailing end of a taken-up film.

What is claimed is:

1. A continuous film take-up apparatus comprising:

a guide feeder means for guiding and feeding a succession of films into a film supplier; and a drive train for rotating a take-up reel of the film supplier;

wherein a guide part of the guide feeder means moves towards the film supplier to place the leading end of a current film under either a film hold-down plate of the reel or the trailing end of a preceding film wound on the reel, and then the guide part of the guide feeder means moves away from the film supplier while lifting the trailing end of the current film away from the reel;

wherein the guide feeder means has a guide section, the guide part constituting a front end of the guide section, and the guide section is such that when the guide section conducts a tilting action, the guide part moves close to or away from the film supplier; and wherein the guide feeder means has feed rollers for feeding the film towards the film supplier and a drive unit for rotating the feed rollers, and the tiltable guide section is actuated by the power of the drive unit transmitted through a common drive shaft to the feed roller.

2. A continuous film take-up apparatus of claim 1, wherein the guide feeder means advances the current film until its leading end comes under either the film hold-down plate or the trailing end of the preceding film.

3. A continuous film take-up apparatus comprising:

an apparatus casing;

a pair of opposing film feed rollers rotatably mounted to said apparatus casing for rotation about rotation axes, respectively;

a feed roller drive motor operably coupled to said film feed rollers;

a film magazine casing mounted to said apparatus casing;

a guide feeder having a base end and a front end, said base end being pivotably mounted to said apparatus casing for pivotal movement about a pivot axis between a rest position in which said front end of said guide feeder is spaced apart from said film magazine casing and a pivoted position in which said front end of said guide feeder is positioned adjacent said film magazine casing;

a cam mounted for rotation with one of said film feed rollers about the respective rotation axis thereof;

a cam follower movably mounted to said apparatus casing adjacent said one of said film feed rollers;

a first engagement element mounted to said cam follower for movement therewith; and a second engagement element mounted to said guide feeder and being operably engaged with said first engagement element such that, when said first engagement element is moved by movement of said cam follower, said second engagement element causes movement of said guide feeder from said rest position to said pivoted position.

4. A continuous film take-up apparatus as recited in claim 3, further comprising a spring mounted to said apparatus casing and said guide feeder and biasing said guide feeder toward said rest position.

5. A continuous film take-up apparatus as recited in claim 3, wherein said guide feeder includes a guide bracket and a tilt guide which are separately movably mounted to said apparatus casing for respective movement between rest positions and pivoted positions;

said second engagement element is mounted on said guide bracket; and said tilt guide is supported on said guide bracket.

6. A continuous film take-up apparatus as recited in claim 5, wherein said tilt guide includes a film hold down unit; and said film hold down unit comprises a guide rod, a guide block slidably mounted on said guide rod, a film hold down pivotably mounted to said guide block, a spring urging said slide block toward said front end of said guide feeder, and a rope attached between said guide block and said apparatus casing and retaining said guide block in a rearward position against the urging of said spring when said guide feeder is in said rest position and allowing said guide block to be moved forwardly by said spring upon movement of said guide feeder toward said pivoted position.

* * * * *